Patented Aug. 8, 1950

2,517,594

UNITED STATES PATENT OFFICE 2,517,594

PROCESS FOR PREPARING CADMIUM SULFIDE AND CADMIUM SULFOSELENIDE PIGMENTS

James J. O'Brien, Baltimore, Md., assignor to The Glidden Company, Cleveland, Ohio, a corporation of Ohio No Drawing. Application October 6, 1947, Serial No. 778,263

16 Claims. (Cl. 23—134)

This invention relates to improvements in methods for producing cadmium pigments, and it relates particularly to methods wherein a water-soluble cadmium salt is reacted with a water-soluble sulfide or sulfo-selenide salt to precipitate cadmium sulfide or cadmium sulfo-selenide in a pure state or in admixture with a coprecipitated extender pigment such as barium sulfate.

It has long been recognized in this art that cadmium oxide in a cadmium pigment of the sulfide or sulfo-selenide type is detrimental to the clarity and brightness of such color pigments, and various expedients have been used heretofore to reduce the amount of cadmium oxide usually found as a contaminant in the finished pigment. It has been recognized that such oxide may be formed during calcination of the pigment either as a result of oxidizing the sulfide or sulfo-selenide to the oxide, or as a result of calcining cadmium hydroxide which had been precipitated in the crude pigment during the strike thereof. The formation of cadmium hydroxide during the strike is generally attributed to the presence of hydroxyl ions created by hydrolysis of the alkali or alkali-earth sulfide solution according to the following equation:

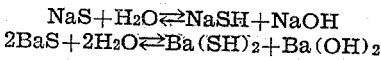

$$NaS + H_2O \rightleftharpoons NaSH + NaOH$$
$$2BaS + 2H_2O \rightleftharpoons Ba(SH)_2 + Ba(OH)_2$$

This invention relates to the use of a particular salt during the strike to establish conditions which have the apparent effect of solubilizing the cadmium hydroxide which would otherwise tend to be precipitated, thereby preventing or minimizing the formation and precipitation of cadmium hydroxide. By so suppressing the presence of cadmium hydroxide in the pigment prior to calcination and by subsequently calcining the pigment under any of the conditions known to the art which prevent the oxidation of the pigment to cadmium oxide, then cadmium color pigment of enhanced clarity and brightness of color may be obtained.

It accordingly is an object of my invention to produce cadmium color pigments of improved clarity and brightness.

It is another object to provide a method by which the presence of cadmium hydroxide in the pigment prior to calcination may be substantially reduced or eliminated.

It is a further object to provide an improved method for precipitating cadmium sulfide or sulfo-selenide pigment by means of which the concomitant precipitation of cadmium hydroxide may be largely avoided.

It is a still further object of my invention to attain the foregoing objectives through a process which is eminently commercially practicable.

These and other objects will be apparent from the following description of the invention and the examples showing my preferred mode of utilizing the invention.

In the course of my experiments relating to the improvement of cadmium colors, I have found that ammonium sulfate in relatively small concentrations has an effect which to my knowledge has not heretofore been recognized or employed in the precipitation of cadmium color pigment. As will be understood by those skilled in this art, it is customary to precipitate the cadmium color pigments by reacting (striking) a solution of cadmium salt such as cadmium nitrate or sulfate with a solution of a soluble sulfide such as sodium sulfide or barium sulfide. Such reaction produces a cadmium sulfide pigment with or without barium sulfate, depending on the combination of reactants. The cadmium sulfo-selenide colors in a pure state or extended with barium sulfate are prepared in analogous manner except that prior to the calcination selenium is incorporated in the material to be calcined as by dissolving selenium in the sulfide solution, and then using the sulfo-selenide solution in the strike. Those skilled in the art will also recognize that the soluble sulfide or sulfo-selenide solution is generally considered to undergo hydrolysis, as indicated by the equations above, to form sulf-hydrates and hydroxides, and that the hydroxides so formed lead to the precipitation of cadmium hydroxide during the strike. This precipitation of cadmium hydroxide is objectionable because it is ultimately calcined to cadmium oxide and this cadmium oxide impairs the brightness and clarity of the colors. In the course of my efforts to eliminate the precipitation of cadmium hydroxide during the strike, I have found that when ammonium sulfate is incorporated in the strike pulp, as for example by dissolving ammonium sulfate in the solution of cadmium salt, to provide a concentration in the latter of about 35–45 grams per liter, or more, then the formation of cadmium hydroxide can be almost completely suppressed and the maximum improvement in clarity and brightness of color is obtained. If lesser concentrations of ammonium sulfate are used, the suppression of cadmium hydroxide is incomplete and the improvement in clarity and brightness of color is diminished. If concentrations less than about 20 grams per liter are used, the improvement in clarity and brightness is so slight as to be of little commercial value.

I therefore advocate the use of ammonium sulfate concentrations greater than about 20 grams per liter of cadmium salt solution and I prefer to use concentrations around 35–45 grams per liter. Concentrations greater than about 50 grams per liter offer no additional improvement in the color of the pigment but do no harm either. They may therefore be used advantageously when for example it is more convenient to provide a considerable excess concentration than to control the concentration precisely at the optimum value of 35–45 grams per liter. The cost of the salt, however, imposes some economic limitations on the use of concentrations above the optimum and for most purposes concentrations above 50 grams per liter would seldom be employed economically.

It will be appreciated that the optimum concentration of ammonium sulfate varies somewhat with the concentration of the strike solutions employed and their temperatures. Under my preferred operating conditions, a concentration of about 40 grams per liter appears to be about the optimum value, but under other equally suitable operating conditions the optimum concentration may be as low as 35 grams per liter, or as high as 45 grams per liter.

In contrast with the above described effects of ammonium sulfate, I have found that ammonium chloride is wholly devoid of a corresponding effect over its entire concentration range from traces to a condition of saturation.

It will be understood that by providing an ammonium sulfate content in the cadmium salt solution within the ranges indicated above, a lower cadmium oxide content in the finished pigment is obtained and this effect in turn produces cleaner and brighter cadmium colors whether they be pure sulfide colors, extended sulfide colors, pure sulfo-selenide colors, or extended sulfo-selenide colors.

In practicing my invention, any concentration of cadmium salt may be used, but I prefer to employ solutions of cadmium salts which have densities between about 25° Bé. and 45° Bé. The following table shows the weight of cadmium sulfate or cadmium nitrate needed per liter to prepare solutions of various densities, when containing 40 grams per liter of ammonium sulfate in addition to the cadmium salt:

| Density, ° Bé. @ 20° C. | $CdSO_4$ | $Cd(NO_3)_2$ |
|---|---|---|
|  | gr./l. | gr./l. |
| 25° | 210 | 226 |
| 35° | 338 | 381 |
| 45° | 484 | 1 559 |

1 Contains undissolved crystalline material.

A cadmium solution of desired density is reacted in any of the usual manners (e. g., simultaneous strike, cadmium first, etc.) with a soluble sulfide solution (containing or not appropriate amounts of dissolved selenium) at densities ranging from about 15.5° Bé. to 23.1° Bé. The temperature at which the strike is effected may range from about 50° C. to about 80° C. but preferably is between about 50° C. and 70° C. The strike is effected on the basic side (pH over 7) but regulated so that a pH of about 9.0 is not exceeded when barium sulfide is the soluble sulfide. Preferably, it is regulated to a pH between about 7.6 and 8.7. When sodium sulfide is the soluble sulfide, a pH of about 10 is used.

After the pigment has been precipitated, it is filtered, washed to remove soluble salts, ground and then calcined. In order to retain the benefits accruing to the crude pigment by the suppression of cadmium hydroxide in it, it is desirable that the calcination be performed under any of the known conditions which are effective in preventing oxidation of the cadmium sulfide or sulfo-selenide to cadmium oxide. Furthermore, for the same reason the calcined charge should be quenched in water directly upon discharge from the calcining furnace. Thereafter, the calcined and quenched pigment may be further washed if desired and dried at temperatures which avoid oxidation of the pigment. Pigment so prepared will exhibit all the clarity and brilliance of color brought about by suppressing the presence of cadmium oxide.

The following examples are illustrative of the invention:

Example 1

(A blank showing the preparation of a cadmium lithopone color without using ammonium sulfate.)

A cadmium red lithopone was prepared by dissolving 23 grams of selenium in 1122 cc. of a barium sulfide solution (having a density of 15.5° Bé. at 20° C.), and then slowly adding this solution to 500 cc. of a cadmium sulfate solution (density of 35° Bé. at 20° C.) while maintaining the temperature of the mixed solutions at about 60° C. The pH of the pulp was 8.7, and after digesting the pulp at 60° C. for 15 minutes the pH had dropped to 8.4. Thereupon, 18 cc. additional barium sulfide solution were added to restore the pH to 8.7, and the pulp was digested 15 minutes more at 60° C. The precipitated pigment was then filtered, after which it was slurried in 2 liters of water at 50° C. for 15 minutes, refiltered, and dried at about 150° C. The dry pigment was next calcined at temperatures ranging from 368° C. at the start of calcination to 640° C. at the end of the calcination. The pigment was promptly quenched upon completion of the calcination and finally dried. The finished pigment had a brownish red color due to the presence of cadmium oxide.

Example 2

(For comparison with Example 1 to show the improvements effected by using ammonium sulfate.)

A cadmium red lithopone pigment was prepared by dissolving 23 grams of selenium in 1254 cc. of barium sulfide solution (density of 15° Bé. at 20° C.), and then slowly adding this solution to 500 cc. of cadmium sulfate solution (density 35° Bé. at 20° C.) having dissolved in it 20 grams of ammonium sulfate, the addition of the barium sulfide solution to the cadmium sulfate-ammonium sulfate solution being carried out while maintaining the temperature of the resulting mixed solutions at about 60° C. The pH was 8.7 and after digesting the mixed solutions at 60° C. for 15 minutes, the pH had dropped to 8.5. Thereupon, 14 cc. additional barium sulfide solution were added to restore the pH to 8.7, and the pulp was digested 15 minutes more at 60° C. The pigment was then filtered, after which it was slurried in 2 liters of water at 50° C. for 15 minutes, refiltered, and dried at about 150° C. The dry pigment was next calcined in the same manner as the pigment of Example 1 (temperature range 368° C. to 640° C.), quenched, filtered and dried. The finished pigment had a bright red color.

Example 3

(A blank showing the preparation of a pure cadmium color without using ammonium sulfate.)

A pure cadmium red was prepared by dissolving 23 grams of selenium in 965 cc. of sodium sulfide solution (density 10.8° Bé. at 20° C.), and then slowly adding this solution to 500 cc. of cadmium sulfate solution (density 35° Bé at 20° C.) while maintaining the temperature of the resulting mixture at about 50° C. When the solution was found by test to contain no soluble cadmium, its pH was 9.8. Additional sodium sulfide solution was added to produce a pH of 10. The pulp was next digested for 30 minutes at 50° C., without change of pH, after which the pigment was filtered and then reslurried seven times in 2-liter water washes at 60° C. After the seventh wash, the pigment was filtered, and dried at about 150° C. The dry pigment was calcined from a temperature of 368° C. at the beginning of calcination to 640° C. at the end, and was promptly quenched from the final calcining temperature. It was next filtered, and finally dried. The finished pigment was of a brownish red color due to the presence of cadmium oxide.

Example 4

(For comparison with Example 3, to show the improvement effected by using ammonium sulfate.)

A pure cadmium red pigment was prepared by dissolving 23 grams of selenium in 1072 cc. of sodium sulfide solution (density 10.8° Bé. at 20° C.) and then slowly adding this solution to 500 cc. of cadmium solution (density 35° Bé. at 20° C.) having dissolved therein 20 grams of ammonium sulfate, the temperature of the resulting mixture of solutions being maintained at about 50° C. When the solution was found by test to contain no soluble cadmium, its pH was 9.8. Additional sodium sulfide solution was added to produce a pH of 10. The pulp was next digested for 30 minutes at 50° C., without change of pH, after which the pigment was filtered and then reslurried seven times in 2-liter water washes at 60° C. After the seventh wash, the pigment was filtered, and dried at about 150° C. The dry pigment was calcined in the same manner as the pigment of Example 3 (at temperatures ranging from 368° C. to 640° C.), quenched, filtered and dried. The finished pigment had a bright red color.

Example 5

A partly extended pigment may be prepared by reacting a barium sulfide solution with a cadmium nitrate solution which contains ammonium sulfate. A pigment was prepared in this way at 50° C. by dissolving 40 grams of ammonium sulfate in 1000 cc. of cadmium nitrate solution (density 35.3° Bé. at 20° C.) and then slowly adding to this solution 2396 cc. of a barium sulfide solution (density 15.5° Bé. at 20° C.) having 100 grams of selenium dissolved in it. The pH of the resulting pulp was 8.9. The pigment was filtered, then reslurried twice at 50° C. with 4-liter water washes, filtered finally, and dried at 150° C. The dry pigment was then mixed with 5% of ammonium nitrate, in accordance with the principles explained in my United States Patent No. 2,220,116, and was calcined from an initial temperature of 368° C. to a final temperature of 587° C. The calcined pigment was promptly quenched from the latter temperature, filtered, and dried. It contained 23% barium sulfate and had a very bright red color; its tinting strength was 145%.

In the foregoing examples the ammonium sulfate content of the strike pulp was introduced by adding ammonium sulfate per se to the cadmium salt solution. It will be understood, however, that other sources of ammonium sulfate may be employed alone or in combination with additions of ammonium sulfate per se. For example, when cadmium metal is dissolved in sulfuric acid the attack is hastened considerably by adding nitric acid to the sulfuric acid, as I have explained in my United States Patent No. 2,220,117. The reaction between the cadmium metal and the nitric acid generates ammonia and/or other volatile amines. As explained in my U. S. Patent No. 2,220,116, if an excess of nitric acid is employed, then the finished solution contains ammonium nitrate and other nitrates. If, however, for the purpose of practicing the present invention, the nitric acid is proportioned so that no excess remains upon completion of the attack, and if enough excess sulfuric acid is provided to combine with the ammonia generated by the nitric acid, then the finished cadmium sulfate solution will contain ammonium sulfate and only traces of ammonium nitrate. Such a solution should be analyzed after the attack has been completed to determine its ammonium sulfate concentration. Then ammonium sulfate per se may be added in sufficient quantity to attain the desired concentration between about 20 and 50 grams per liter of cadmium sulfate solution.

A further expedient may be employed to accomplish the ends last mentioned above, in that instead of using only nitric acid per se in the attack of the cadmium metal, the necessary nitric acid may be formed in situ by adding ammonium nitrate to the sulfuric acid. The reaction is:

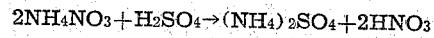

$$2NH_4NO_3 + H_2SO_4 \rightarrow (NH_4)_2SO_4 + 2HNO_3$$

This reaction consumes part of the sulfuric acid in forming ammonium sulfate, while free nitric acid is liberated. This free nitric acid then is reduced by the cadmium metal, as explained in Patent No. 2,220,117, to liberate ammonia which may combine with more sulfuric acid to form additional ammonium sulfate. In this manner ammonium nitrate may be used alone or in combination with nitric acid to provide the desired concentration of ammonium sulfate in the finished cadmium solution.

Example 6

A cadmium sulfate solution was prepared by heating 2265 grams of cadmium metal with 1709 grams of 60° Bé. sulfuric acid, 378 grams of ammonium nitrate, and 4250 grams of water at temperatures between about 190° F. and 212° F. until no further cadmium could be dissolved. About 850 grams of cadmium remained after the treatment. An analysis of the resulting solution established that it contained only a trace of nitrates, but had an ammonium sulfate concentration of 51.8 grams per liter of cadmium sulfate solution at 35° Bé. and 20° C. Contaminants like iron and nickel may be removed from the solution in various ways well known to those skilled in the art.

Red and yellow pigments made by striking separate portions of this solution, after purification, with soluble sulfo-selenide and sulfide solutions, respectively, by the general methods outlined in Examples 2 and 4, and calcining the resulting precipitates, yielded pigments which exhibited bright, clear colors.

Having now explained my invention, it will be understood that numerous modifications may be made in the practice thereof without departing from the principles on which it is based. Such modifications as come within the scope of the following claims are contemplated as integral parts of the invention.

Having disclosed the invention, what I claim is:

1. The process of preparing a pigment of the group consisting of cadmium sulfide pigments and cadmium sulfoselenide pigments which comprises reacting an aqueous cadmium salt solution containing up to about fifty grams per liter of ammonium sulfate with a water-soluble sulfide solution to precipitate a crude cadmium sulfide pigment, washing the crude pigment and calcining it under conditions which minimize the oxidation of the pigment to cadmium oxide.

2. The process of claim 1 wherein the water-soluble sulfide solution contains dissolved selenium.

3. The process of preparing a pigment of the group consisting of cadmium sulfide pigments and cadmium sulfo-selenide pigments which comprises reacting an aqueous cadmium salt solution containing up to about fifty grams per liter of ammonium sulfate with a water-soluble sulfide solution to precipitate a crude cadmium sulfide pigment, washing the crude pigment and calcining it.

4. The process of claim 3 wherein the soluble sulfide solution contains dissolved selenium.

5. The process of preparing a pigment of the group consisting of cadmium sulfide pigments and cadmium sulfo-selenide pigments which comprises reacting an aqueous cadmium salt solution containing between about 20 and 50 grams per liter of ammonium sulfate with a water-soluble sulfide solution to precipitate a crude cadmium sulfide pigment, washing the crude pigment and calcining it under conditions which minimize the oxidation of the pigment to cadmium oxide.

6. The process of claim 5 wherein the soluble sulfide solution contains dissolved selenium.

7. The process of preparing a pigment of the group consisting of cadmium sulfide pigments and cadmium sulfo-selenide pigments which comprises reacting an aqueous cadmium salt solution containing between about 20 and 50 grams per liter of ammonium sulfate with a water-soluble sulfide solution to precipitate a crude cadmium sulfide pigment, washing the crude pigment and calcining it.

8. The process of claim 7 wherein the soluble sulfide solution contains dissolved selenium.

9. The process of preparing a pigment of the group consisting of cadmium sulfide pigments and cadmium sulfo-selenide pigments which comprises reacting an aqueous cadmium salt solution containing about 35 to 45 grams per liter of ammonium sulfate with a water-soluble sulfide solution to precipitate a crude cadmium sulfide pigment, washing the crude pigment and calcining it under conditions which minimize the oxidation of the pigment to cadmium oxide.

10. The process of claim 9 wherein the soluble sulfide solution contains dissolved selenium.

11. The process of preparing a pigment of the group consisting of cadmium sulfide pigments and cadmium sulfo-selenide pigments which comprises reacting an aqueous cadmium salt solution containing about 35 to 45 grams per liter of ammonium sulfate with a water-soluble sulfide solution to precipitate a crude cadmium sulfide pigment, washing the crude pigment and calcining it.

12. The process of claim 11 wherein the soluble sulfide solution contains dissolved selenium.

13. The process of preparing a pigment of the group consisting of cadmium sulfide pigments and cadmium sulfo-selenide pigments which comprises the steps of: reacting cadmium metal with a mixture of sulfuric acid, ammonium nitrate and water until a cadmium sulfate solution neutral to methyl orange is formed, the cadmium metal being in excess of its stoichiometric ratio to the $SO_4$ of the mixture, and the nitric acid which is formed in situ from said ammonium nitrate being sufficient to effect rapid combination of cadmium with all of the $SO_4$ content of the mixture except that which is combined with ammonium ions in the form of ammonium sulfate; removing the excess metallic cadmium from the cadmium sulfate solution thus formed to produce a clarified cadmium sulfate solution; and reacting the said clarified solution with a water-soluble sulfide solution.

14. The process of claim 13 wherein the soluble sulfide solution contains dissolved selenium.

15. The process as claimed in claim 13 wherein the ammonium nitrate is proportioned to provide an ammonium sulfate concentration of between about 20 and 50 grams per liter in the said clarified solution.

16. The process as claimed in claim 13 wherein the ammonimum nitrate is proportioned to provide an ammonium sulfate concentration of about 35 to 45 grams per liter in the clarified cadmium sulfate solution.

JAMES J. O'BRIEN.

No references cited.